(No Model.)

J. KNOUS.
VELOCIPEDE.

No. 322,543. Patented July 21, 1885.

WITNESSES
Homer H. Fiske
E. P. J. Morton

INVENTOR
John Knous
By Charles E. Pratt
Atty

UNITED STATES PATENT OFFICE.

JOHN KNOUS, OF HARTFORD, CONNECTICUT, ASSIGNOR TO THE POPE MANUFACTURING COMPANY, OF SAME PLACE.

VELOCIPEDE.

SPECIFICATION forming part of Letters Patent No. 322,543, dated July 21, 1885.

Application filed February 7, 1885. (No model.)

*To all whom it may concern:*

Be it known that I, JOHN KNOUS, of Hartford, Connecticut, have invented certain new and useful Improvements in Velocipedes, of which the following is a specification.

My improvements relate to those parts of velocipedes, whether bicycles or tricycles, which are called "steering-heads" and "handle-bars," and the attachment of the same; and the nature of them will be apparent from the following description, taken in connection with the drawings, in which—

Figure 1:
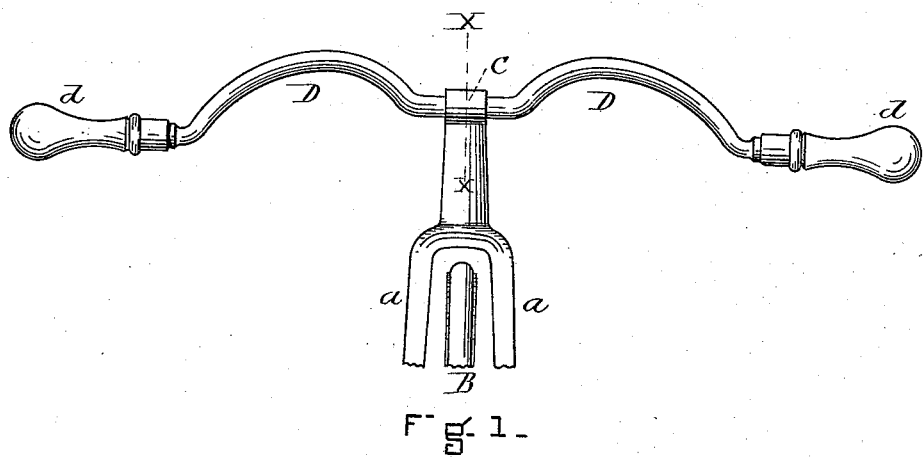
Figures 2, 3:
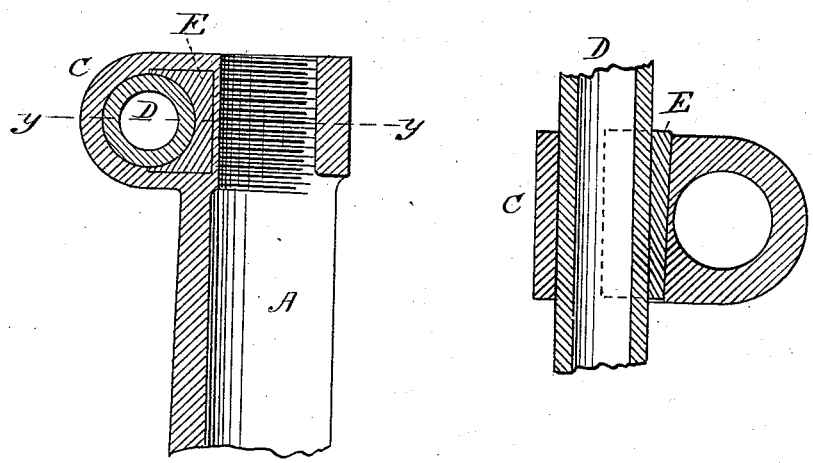
Figure 4:
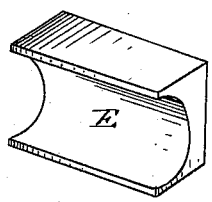

Figure 1 shows in front elevation a portion of a bicycle-wheel and front fork, and a steering-head and handle-bar of the form known as a "cow-horn" handle-bar, in position, as secured together by means of my improvements in one form. Fig. 2 shows in vertical section on the line $x$ in Fig. 1 parts of the same. Fig. 3 shows parts of the same in transverse section on the line $y\ y$ in Fig. 2, and Fig. 4 shows in half perspective one portion of my improved contrivance in one form, which I call the "key."

A is a cylindrical head, and $a\ a$ are the sides or branches of the front fork connected therewith.

B is a portion of the wheel.

C is a handle-bar lug, substantially in the exterior form heretofore in use, though somewhat extended in the direction of the line $y\ y$ in Fig. 2.

D is a continuous handle-bar, which I prefer to make of hollow or tubular metal curved upward on either side of the lug, to allow room for the legs of the rider to operate, and curved downward at its ends for the handles, and to bring the hands of the rider to a better and lower position.

In the lug C is a transverse slot, mortise, or opening in part formed of the circumferential form of the handle-bar and in part of a different form, and which is larger in one direction—for instance, in that of the line $y\ y$—than the diameter of the handle-bar. When one of the handles $d$ at the end of the bar is removed, the bar B may be easily passed into and out of position in the lug C, the greater diameter of the mortise in the lug allowing the bar to pass through it over the curves.

E is a key made on one side to correspond with the form of the bar B and on its other sides to correspond with the unfilled sides of the mortise in the lug C, and may be slightly tapered and fitted to so that it may be inserted in the mortise in the lug after the handle-bar is in position, and so as to firmly secure the bar and the lug together, as shown in Figs. 2 and 3.

It is obvious that this method of attachment of the handle-bar and steering-head gives a simple, efficient, light, and comely means of securing the two together and of releasing them, so as to form a detachable continuous handle-bar mechanism particularly suitable for a curved bar or a hollow bar, without devices entering into or weakening the structure of the bar, or projecting over or adding to the weight of the lugs, and that it affords the advantage of a closed lug in front. It is also obvious that variations in the form of the devices referred to or position of parts may be made without departing from the substance of my invention; and I do not limit myself to the form, proportions, positions, or other exact details of the devices herein shown and described.

I am aware of Letters Patent No. 310,776 to W. P. Benham, and Letters Patent No. 318,500 to C. E. Pratt; and my mechanism herein described is made in the way of improvements thereon.

I also disclaim the combination, with a handle-bar, of a handle-bar lug having an elongated opening, through which the handle-bar may be passed, and a fastening device whereby the handle-bar is secured in the elongated opening, as I am satisfied upon investigation, since the completion of my invention and filing of this specification, that Mr. E. G. Latta was prior to me in his invention thereof, for which he filed application for patent thereon on the 10th day of December, 1884; but I believe that I was the first to make a velocipede steering-head and handle-bar lug in one solid piece of metal, with an elongated slot in the lug suited to the insertion and withdrawal of a bent continuous handle-bar, and in which the handle-bar is held by a key complementary to the bar in filling the slot, and in the combination of which parts the bar is held in a two-part device with greater simplicity and rigidity, and that it is an improvement upon Latta's contrivance.

I claim as new and of my invention—

In a velocipede, a continuous handle-bar, D, a closed lug, C, formed on one side of and solid with the steering-head, a mortise in the lug and substantially aside from the axial bore of the head for the reception of the bar, and conformed to the latter on one side and sufficiently larger on the opposite side to admit of the endwise insertion of the bar with all its curves, and a movable key, E, conformed to the bar on one side and to the excess of the mortise on the other side, all constructed and combined to operate substantially without interference with the adjusting-bolt or set-nut of the steering-centers, and essentially as set forth.

JNO. KNOUS.

Witnesses:
   A. J. WELLES,
   E. S. HOUSE.